United States Patent [19]

Langelaan

[11] Patent Number: 5,140,676
[45] Date of Patent: Aug. 18, 1992

[54] DESKTOP PUBLISHING SYSTEM AND METHOD OF MAKING UP DOCUMENTS

[75] Inventor: Freddy J. Langelaan, Reuver, Netherlands

[73] Assignee: Oce-Nederland B.V., Venlo, Netherlands

[21] Appl. No.: 519,652

[22] Filed: May 7, 1990

[30] Foreign Application Priority Data

May 8, 1989 [NL] Netherlands ............... 89001151

[51] Int. Cl.$^5$ .............................................. G06F 15/20
[52] U.S. Cl. .................................. 395/145; 395/148
[58] Field of Search ............ 364/518, 521, 523, 419; 395/144–149

[56] References Cited

U.S. PATENT DOCUMENTS

| | | | |
|---|---|---|---|
| 4,464,652 | 8/1984 | Lapson et al. | 340/710 |
| 4,506,343 | 3/1985 | Shipp, Jr. et al. | 340/706 |
| 4,723,209 | 2/1988 | Hernandez et al. | 364/300 |
| 5,001,654 | 3/1991 | Winiger et al. | 364/523 |
| 5,003,499 | 3/1991 | Fujiwara et al. | 364/523 |
| 5,033,008 | 7/1991 | Barker et al. | 364/523 |

FOREIGN PATENT DOCUMENTS 0185904 7/1986 European Pat. Off. .

OTHER PUBLICATIONS

Workstation Publishing Software, Interleaf Reference Manual, Vol. 1, Sun/Release C, Interleaf Inc., 1986, pp. 6–21, 6–22.

*Primary Examiner*—Heather R. Herndon
*Attorney, Agent, or Firm*—Reed Smith Shaw & McClay

[57] ABSTRACT

A desktop publishing system is adapted to the interactive makeup and management of documents according to a model, in which model a document is made up of one or more kinds of components characterized by contents, name and properties, and which model represents a number of text columns. For each text column a corresponding component column is at least partially reproduced on the screen. For each component an indication is displayed in the respective component column, the indication being in the form of an identification symbol of this component to identify the start of the contents of the component at the level of said component in the text column.

8 Claims, 9 Drawing Sheets

DESKTOP PUBLISHING SYSTEM AND METHOD OF MAKING UP DOCUMENTS

FIELD OF THE INVENTION

The invention relates to desktop publishing system and method and, in particular, to system for providing a visual indication or display of components used in formatting each column in a document.

BACKGROUND OF THE INVENTION

Desktop publishing systems using a screen, inputting means for inputting document information and commands, and a processing unit are well known.

Various methods for editing data stored in word processing systems are known, e.g., U.S. Pat. No. 4,506,343. These systems also include methods for editing compound documents, e.g., U.S. Pat. No. 4,723,209 and for creating a special document from a master document, e.g., European Patent Application No. 0185904.

It is also known to couple the processing unit to a screen and to an inputting means to interactively makeup and manage documents according to a model. The model comprises a document made up of one or more kinds of components characterized by contents, name and properties. This model represents a number of text columns for reproducing at least part of the contents of the document, said processing unit being adapted to set up a separate component column for each text column, in order to identify, in case of presentation of a component column on the screen, the start of the contents of the component by an indication at the level of the component contained in the text column concerned.

A commercially available system of this kind is sold in the form of a computer and a software package known as the "Workstation Publishing System" by Interleaf, Inc., Cambridge, Mass., U.S.A. It is described, for example, in its reference Manual "Workstation Publishing Software," Vol. 1, SUN/Release C. In this particular system, the inputting means comprise a keyboard and a mouse. The mouse can be used by the operator to select a position on the screen, whereupon he can input commands or text at that place on the screen by using the keyboard. This system also uses menus which appear on the screen locally after a button on the mouse has been pressed and which comprise a set of commands from which the operator, again using the mouse, can select and execute one.

The known system enables the operator to prepare a document consisting of different parts, named components. Kinds of components are: headings, text blocks, graphics, diagrams, pages etc. This document is displayed on the screen in a text window provided with a margin. A label with the name of that component is provided in that margin at the start of each component.

The external characteristics of each component, such as type face and size, margin positions, typographical functions, and so on, are fixed in the properties which may have a different setting or value for each component. The set of properties of a component may be displayed on the screen in a separate window by bringing it up via a menu with the mouse at the label of that component. This window also displays the values of the properties. These can be changed by the operator. If he does not change them, then the values pre-programmed by the supplier (default values) apply.

To increase legibility, the operator will often wish to make the appearance of certain components different, e.g., by printing the heading in bold and centered on the line. He can achieve this by giving the properties of that component a corresponding value.

The known system enables the contents of a document to be displayed in the text window in the form of a number of columns. A column of this kind, which will hereinafter be referred to as the text column, is to be distinguished from a component column, in which an indication of the name of a component contained in the text column currently being worked upon is given at the level of the start of the associated component in front of any margin line. It should be noted that graphic representations or tables may also occur in a text column in addition to the text.

By means of a mouse, for example, the operator is able to move a pointer element or cursor and move from one text column to the other in order to supplement and adapt the document as desired. On moving from one text column to the other, only the component column corresponding to the other text column is displayed in the known system. Thus the component column corresponding to the "active" text column is always visible.

The disadvantage of this system is that with such a representation and display of the component structure of the document it is necessary for the operator always to move from one text column to the other in order to have an idea of the position and kind of all the components present in the different text columns.

Another disadvantage of the known system is that if one or more components are selected from a component column displayed at a specific moment, and, after the changeover to another text column, components from the component column corresponding to this other text column are also selected, whereafter the values of the properties of the components thus selected are changed, the operator, particularly in the case of displaying of a number of text columns, has a considerable risk of losing the overview of his previous selections, because it is not clear what components have been selected in which component columns. The risk of errors is thus considerable. Accordingly, it is an object of the present invention to provide a system and method which overcomes these disadvantages.

SUMMARY OF THE INVENTION

Generally, the present invention provides a desktop publishing system in which the processing unit causes a display, for each text column to be displayed a corresponding component column which is at least partially reproduced on the screen, an indication for each component being displayed on the screen at least in each partially displayed component column, such indication being in the form of an identification symbol of the component contained in a corresponding text column.

The advantage of the desktop publishing system according to the invention is that the operator at all times has, at a glance, a total picture of the structure of all the reproduced text columns, so that it is no longer necessary to change from one text column to another. Other advantages are that the said previous selections of components from component columns corresponding to non-active text columns, can remain visible, for example by a change of color, and that even after performing a selection it remains clear which components have been selected from the different text columns. The risk of errors on changing the properties of the selected components or on destruction of such components is as a result practically eliminated. The unintentional and unnoticed change and destruction of components already selected previously, for example, belongs to the past when the desktop publishing system according to the invention is used.

One embodiment of the desktop publishing system according to the invention is characterized in that at least one indication is displayed on the screen in the component column corresponding to that text column—the "active" text column—which contains a pointer element or cursor, the said indication being in the form of an identification symbol of the component contained in the active text column.

The advantage of this embodiment according to the invention is that in a way in which there is little loss of space at the expense of the available width of the text columns, by displaying all the identification symbols of each component, in each component column, it is clear at a glance which components correspond to one another in respect of kind. This increases the convenience of working with the components in the document and facilitates the flexible and practically foolproof adaptation of the layout of the document by changing the value of the properties of the selected components.

Another embodiment of the desktop publishing system according to the invention is characterized in that at least one indication is displayed on the screen in the component column corresponding to that text column—the "active" text column—which contains a pointer element or cursor, the said indication being in the form of a name of the component contained in the active text column.

The advantage of this embodiment of the desktop publishing system according to the invention is that in addition to the names of the components contained in the active text column it is also possible, if desired, to display the identification symbols or "pictograms" in the component column corresponding to the active text column. By displaying the names of components the latter are also even more readily identifiable.

In yet another embodiment of the desktop publishing system according to the invention, the overview of the different kinds of columns is improved by displaying component columns in a contiguous grouping on one side of the screen, and by displaying the corresponding text columns in a contiguous grouping on the other side of the screen.

The advantage of the latter embodiment of the desktop publishing system according to the invention is that it enables a rapid groupwise election of components distributed more particularly over the different component columns.

Other features and advantages of the system according to the invention and the method according to the invention will be apparent from the following description and the associated drawings, in which like parts have like reference numerals.

BRIEF DESCRIPTION OF THE DRAWINGS

FIG. 1b is a diagram showing the structure of the system shown in FIG. 1a;

PRESENTLY PREFERRED EMBODIMENTS

System Configuration

Figure 1A:
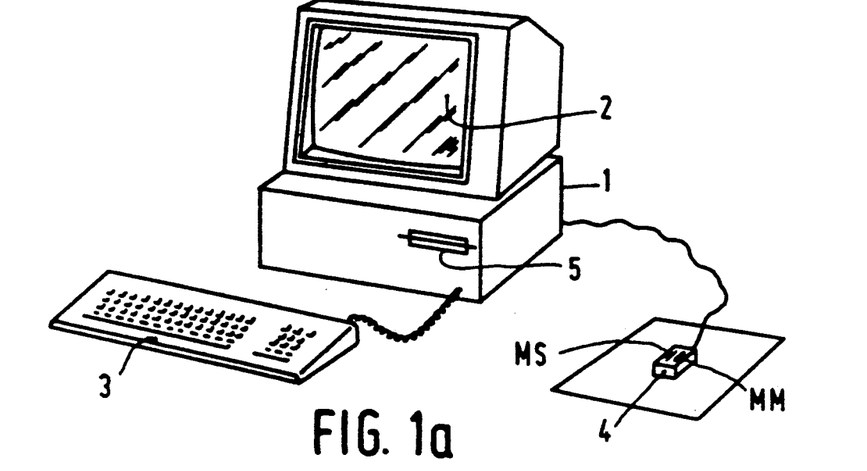
FIG. 1a represents a system according to the invention.
Figure 1B:
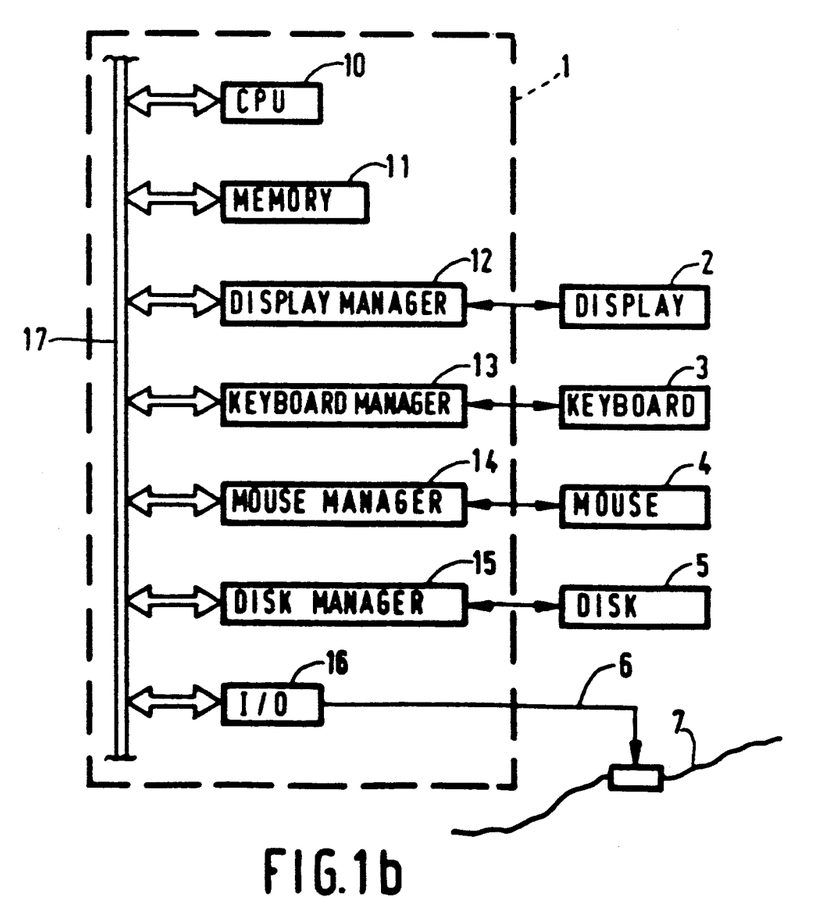

FIGS. 1a and 1b are diagrams showing an embodiment of a system configurations according to the invention. This system comprises a processing unit 1, a display screen 2, a keyboard 3, a mouse 4, a memory disk 5 and a connection 6 to a network 7 for communication with a printer or with other external equipment. The processing unit 1 contains a central processor 10, a memory 11, control units 12, 13, 14 and 15 for, respectively, the screen 2, the keyboard 3, the mouse 4 and the memory disk 5, and also a communications unit 16 which provides communication via the network 7 with external equipment. The units 10 to 16 in the processing unit 1 are interconnected via a system bus 17. For example, the present invention can operate on a Sun System computer having a 2.0 Sun Operating System. The windowing mechanism for multiple columns can be based on the Sun tools, windows and window drivers as set forth hereinafter.

A pointer element or cursor can be moved over the screen 2 by means of the mouse 4. The mouse 4 is provided with at least two press buttons MS and MM for giving commands to the system. By means of the first press button (MS) the operator can select an element indicated on the screen by the cursor, i.e., indicate that an action subsequently to be performed is to be carried out on the data represented by the indicated element on the screen. The system generally gives the operator a feedback by changing the color of the selected element on the screen.

The second press button (MM) is the menu button. When the operator presses this, the system shows on the screen at the cursor location a selection menu with system commands, one of which the operator can indicate by moving the mouse/cursor. The menu generally consists of a number of fields each of which contains a command. When the cursor reaches a field, the latter changes color to indicate that it is selected. When the button MM is released, the system executes the indicated command and removes the menu from the screen. If the operator moves the cursor completely outside the menu and then releases the button MM, the menu disappears from the screen and no action takes place.

A menu may have different levels, i.e., sub-menus can be called up from one or more menu fields, e.g., by moving the cursor outwards in said menu field in a direction indicated by a sign.

The use of a mouse and selection menus is known, for example, from U.S. Pat. No. 4,464,652, which describes a selection menu of the pull-down type in combination with a mouse, so that details of the technology required for this will not be discussed here.

The functions described here can of course be embodied by means other than a mouse, e.g., a joystick, touch screen, function keys on the keyboard, or the like.

Document Model

Figure 2:
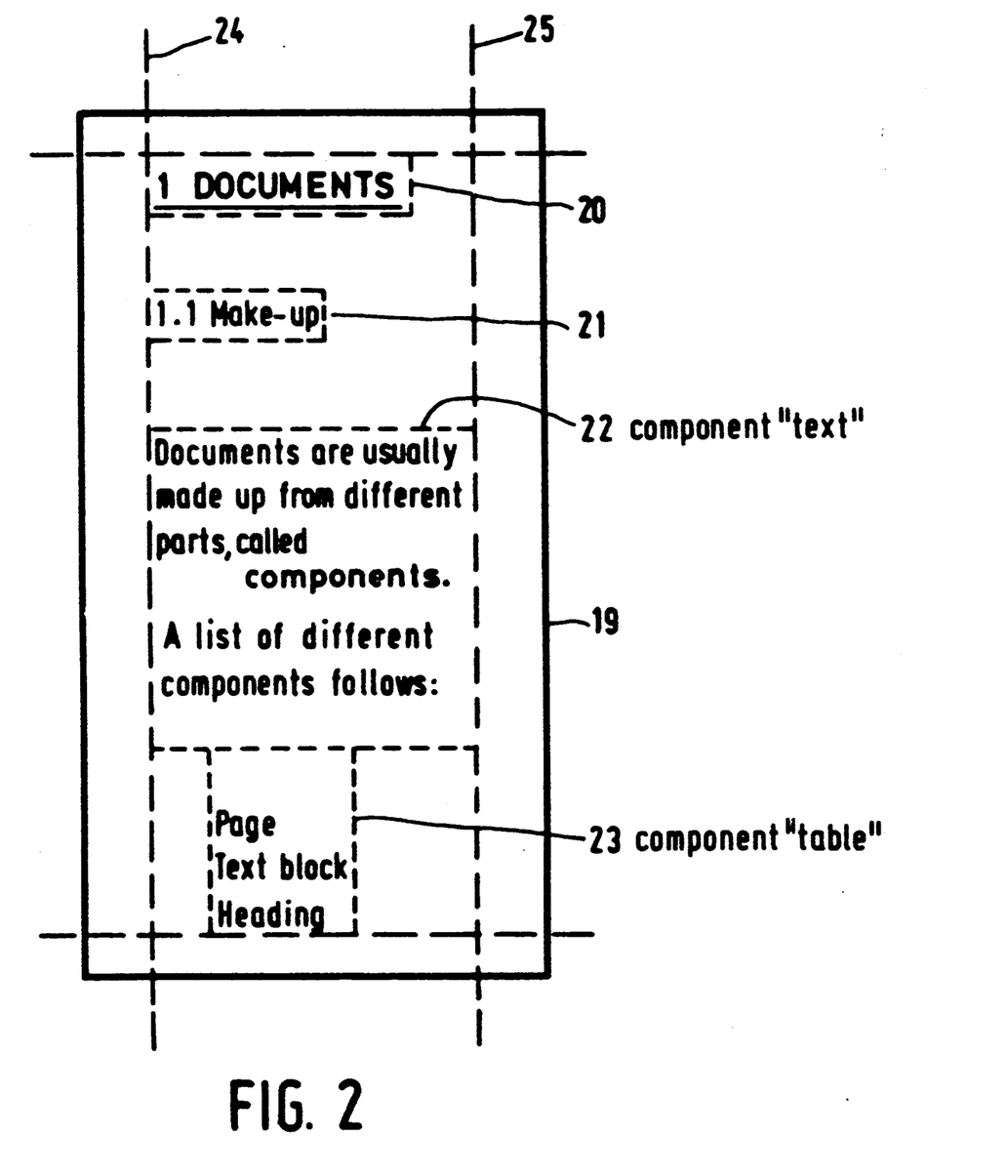
FIG. 2 is an example of a document.

FIG. 2 illustrates an example of a document by reference to which the terminology will be explained of the model for documents as applicable to the model for documents explained hereinafter having a content distributed over more than one column.

The document in FIG. 2 comprises five components, i.e., a page 19, a heading 20, a subheading 21, a text block 22 and a table 23. See U.S. patent application Ser. No. 07/297,838, now U.S. Pat. No. 5,001,654, of which the present applicant was a co-inventor and which is owned by assignee of the present invention.

Components have a name, a content and properties. The content is formed by text or a graphic representation. The properties determine the appearance of the component. The name, the content and the value of the properties of a component can all be filled in and amended by the operator.

The document model of the system according to the invention has various component kinds which differ from one another in respect of their usability in a document, such as "page", "heading", "text block", and so on. The different component kinds have properties coordinated with their function, e.g.:

For a "page": marginal lines, layout parameters for fixed additions ("headers", "footers"), printer instructions;

For a "heading": layout parameters, automatic numbering;

For a "text block": layout parameters, location with respect to page margin; and so on.

Different component kinds thus have different properties as a result of their different functions. Some of them are completely independent and others are defined just with respect to the properties of other component kinds, e.g., the location of a "text block" is defined with respect to the margins of the "page".

Component types arise from filling in values for the name and properties. For example, within the "page" component kind it is possible to form the types "front page", "text page" and "back page" by filling in the value of the properties in different ways. The name of a component type should distinguish the resulting component types from one another. In the example of FIG. 2 the components 20 and 21 both belong to the "heading" kind, but component 20 is of the "main heading" type and component 21 is of the "subheading" type. These types differ from one another as a result of the different value of the "style" property: bold or normal. Similarly, the components 22 and 23 both belong to the "text block" kind, but component 22 is of the "text" type and component 23 of the "table" type, these types differing from one another in respect of their location relative to the margins 24 and 25 (the location of which is fixed in the properties of the "page" 19).

In the present system, different component kinds and component types are pre-programmed as standard. These give sufficient facilities for normal text processing. The advantage of preprogramming the different components kinds and types is that in this way some uniformity can be obtained in the finished product ("house style").

Components are in turn built up from sub-components, e.g., alphanumeric characters. A sub-component also has properties which describe the appearance of the sub-component. These will as a rule have values equal to those of the corresponding properties of the component to which the sub-component belongs, but will sometimes differ, for example if a single word is printed in bold type or italics in a paragraph.

Presentation of a Document

Figure 3:
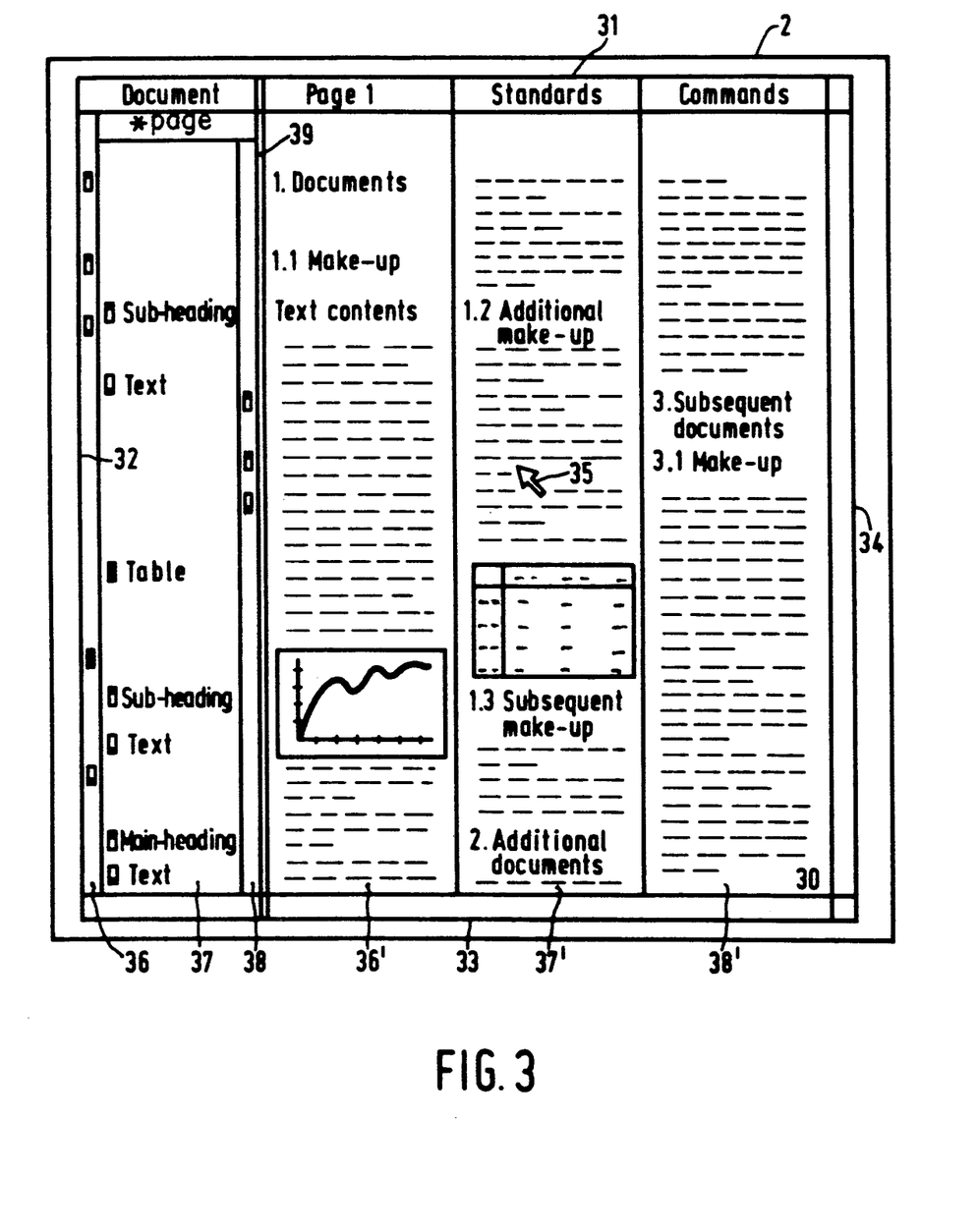
FIG. 3 represents the screen of the system according to the invention, part of a document being contained in three text columns and with three corresponding component columns.

FIG. 3 shows the screen 2 of the present system, displaying thereon the document shown in FIG. 2, which document being now composed of a plurality of columns of text. The text of the document or a part thereof is displayed in a text window 30 surrounded by a frame made up of a top frame 31, a left-hand frame 32, a bottom frame 33 and a right-hand frame 34. The cursor 35 is also present on the screen 2. The top frame 31 is divided into a number of compartments containing the identification of the document, the page number and one or more sub-fields, e.g., the standard field indicated with "Standards" and the command field indicated with "Commands".

In the embodiment of the system reproduced here, the left-hand frame 32 has three component columns, namely 36, 37 and 38. The text window 30 has three text columns 36', 37' and 38' corresponding to the component columns 36, 37 and 38. The way in which a text window 30 built up from a number of text columns can be made up will be explained in detail hereinafter.

The contiguous component columns 36, 37 and 38 are separated from the likewise contiguous text columns 36', 37' and 38' by a margin line 39. In an embodiment not explained in detail the contiguous text column may also be situated on the left of the margin line 39, in which case the contiguous component columns will be situated on the right of the margin line 39. In another embodiment which again is not explained in detail it is possible for a component column to adjoin its corresponding text column to form pairs of associated columns in this way.

In each case, in the component column corresponding to a text column, by means of identification symbol or pictogram at the level where a component starts in the text column, its place will be displayed by means of pictogram in the corresponding component column. For example the main heading "1. Documents" appears in text column 36' and this is shown by a pictogram in the corresponding component column 36. The same applies to the subheading "1.1. Makeup" and the corresponding pictogram of this appearing in the component column 36. The text in the text column 36' starts with the indication "Text contents", the start thereof again being shown in the component column 36 by a pictogram. Since, in the case shown here, the cursor 35 is situated in text column 37', this column is the "active" column. Accordingly, the corresponding component column 37 is completely displayed, i.e., this component column 37 contains at least the name of the components. The complete display of the name in the component column 37 indicates that the corresponding text column 37' is active. To avoid losing too much space for the margin line 39, the name of the component can be reproduced in shortened form in the component column corresponding to the active text column, in this case the component column 37. A narrowing of the component column 37 in this way, in which just the pictograms of the components are visible, is generally less desirable, because then some other way will have to be adopted to show that the associated corresponding text column is active and in that case the component itself will be more difficult to identify due to the absence of the name. It is feasible and also a simple matter to display the names but not the pictograms in the component column corresponding to the active text column, so that a gain in space is obtained in favor of the contents of the text columns. The loss in width in the text window 30 in favor of a larger width of the associated component column is not a problem if use can be made of the possibility of displaying an active column in enlarged form on the screen 2. To this will be returned hereinafter. The maximum gain in space in favor of the width of the text window 30 is obtained by only including in the component column the pictograms of the different components. In the given circumstances it may be desirable to overwrite a non-active text column at least partially with whatever is contained in a component column when displayed on the screen.

The pictograms or identification symbols shown in FIG. 3 have a rectangular shape. It will be clear that other forms of pictograms are also possible. Indication by means of pictograms in the different component columns will generally give the operator most information at the time when the maximum of different kinds of pictograms are included in the component columns. FIG. 3 shows pictograms of a main heading, a subheading, a text, a graphic representation and a table. Other possible indications of the names of components, although not explained in detail, are, for example: heading, intro, chapter, paragraph, and so on.

The values of the properties of each component kind and of each component type can be called up and changed. The values of the properties of sub-components can also be called up and changed. The calling up and changing of these values does not form part of the subject of the present invention and the invention is not limited to the use of a specific system or a specific method in which the properties are called up and changed. Accordingly, this is not explained in the present description of the drawings.

Making Up a Document Comprising a Number of Text Columns

The operation of the system will now be described with reference to the operating procedures for system actions associated with the invention.

In FIGS. 4a, 5a, 6a, 7a and 8, the left-hand side shows the operator's actions and the right-hand side the system actions initiated as a result. In order to explain in detail the making up of a document having two or more columns, we shall start from the situation in which there are as yet no text columns and no component columns. In that case, therefore, only the top frame 31 as shown in FIG. 3 is displayed on the screen 2.

Figure 4A:
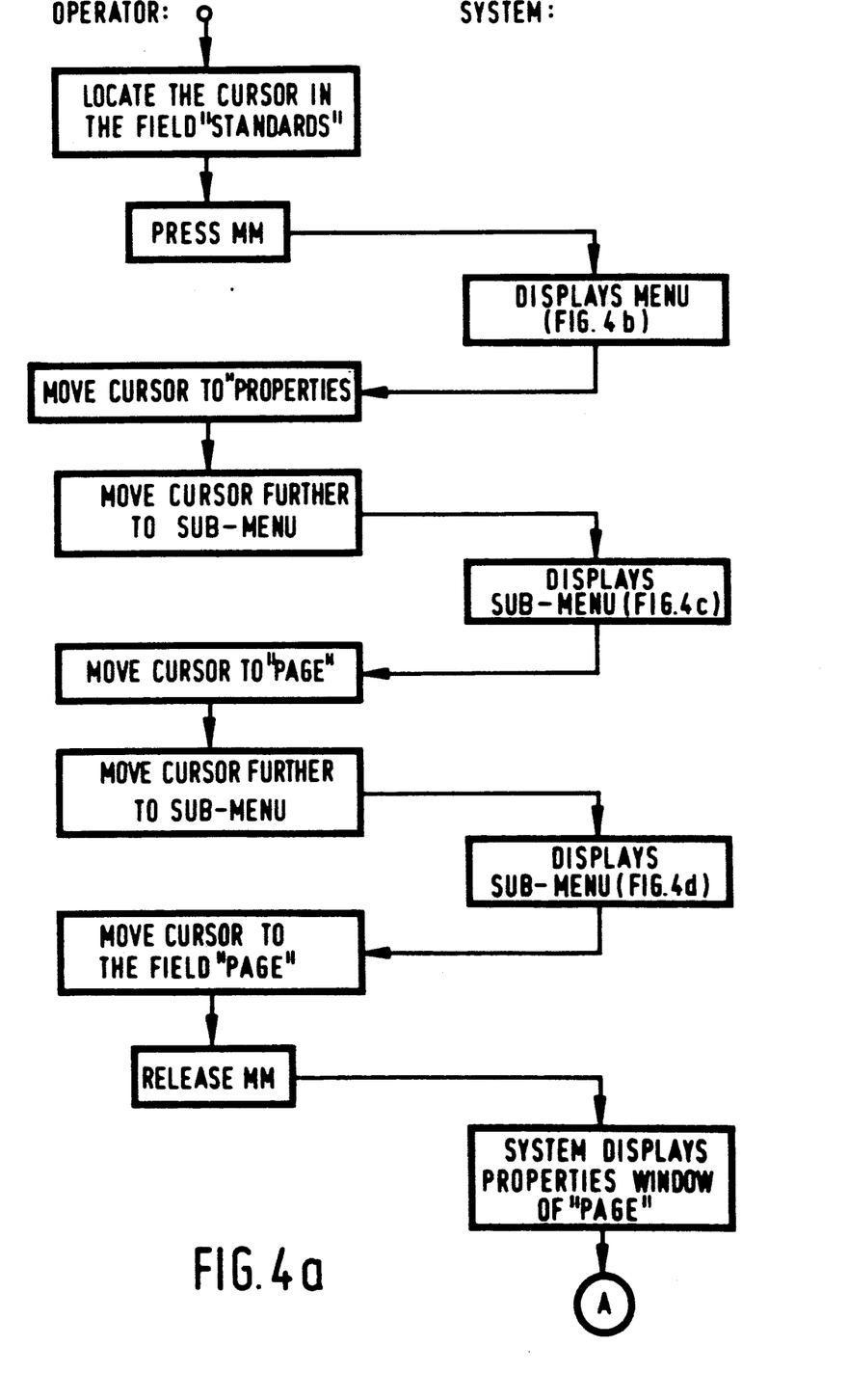
FIGS. 4a, 5a, 6a, 7a and 8 are block diagrams giving a detailed explanation of the system and the method according to the invention.
Figure 4B:
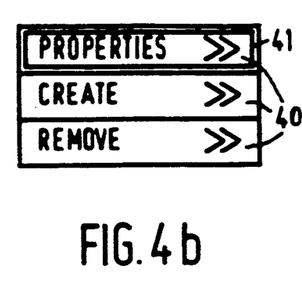
FIGS. 4b, 4c, 4d, 5b, 5c, 6b, 7b and 7c represent possible menus which can be displayed on the screen according to the invention.
Figure 4C:
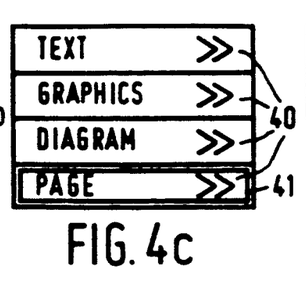
Figure 4D:
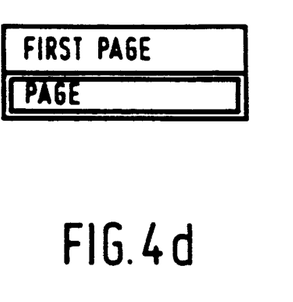

The operator could start the procedure by placing the cursor 35 in the "Standards" field of the top frame 31 of the text window 30 (see FIG. 3). The operator then presses the mouse menu button MM, whereupon the system shows a menu as illustrated in FIG. 4b at the location of the cursor. In this menu, an arrow-shaped symbol 40 is provided at each possible continuation choice to indicate that a continuation menu or sub-menu can be shown here. The operator then moves the cursor which in the menu has assumed the form of a frame 41 around or a change of color of the menu field selected, to the "properties" menu field and moves the mouse in the direction of the symbol 40, whereupon the system shows the continuation menu as illustrated in FIG. 4c. In this continuation menu the operator moves the cursor to the page field and then moves the mouse in the direction of the symbol 40, whereupon the system shows the continuation menu illustrated in FIG. 4d. In this menu the operator moves the cursor to the "page" field. On the release of the mouse menu button MM the system then brings up the properties of the "page" component kind and shows this in a properties window on the screen 2. Other procedures not explained in detail could also be followed in the display of the properties window.

Figure 5A:
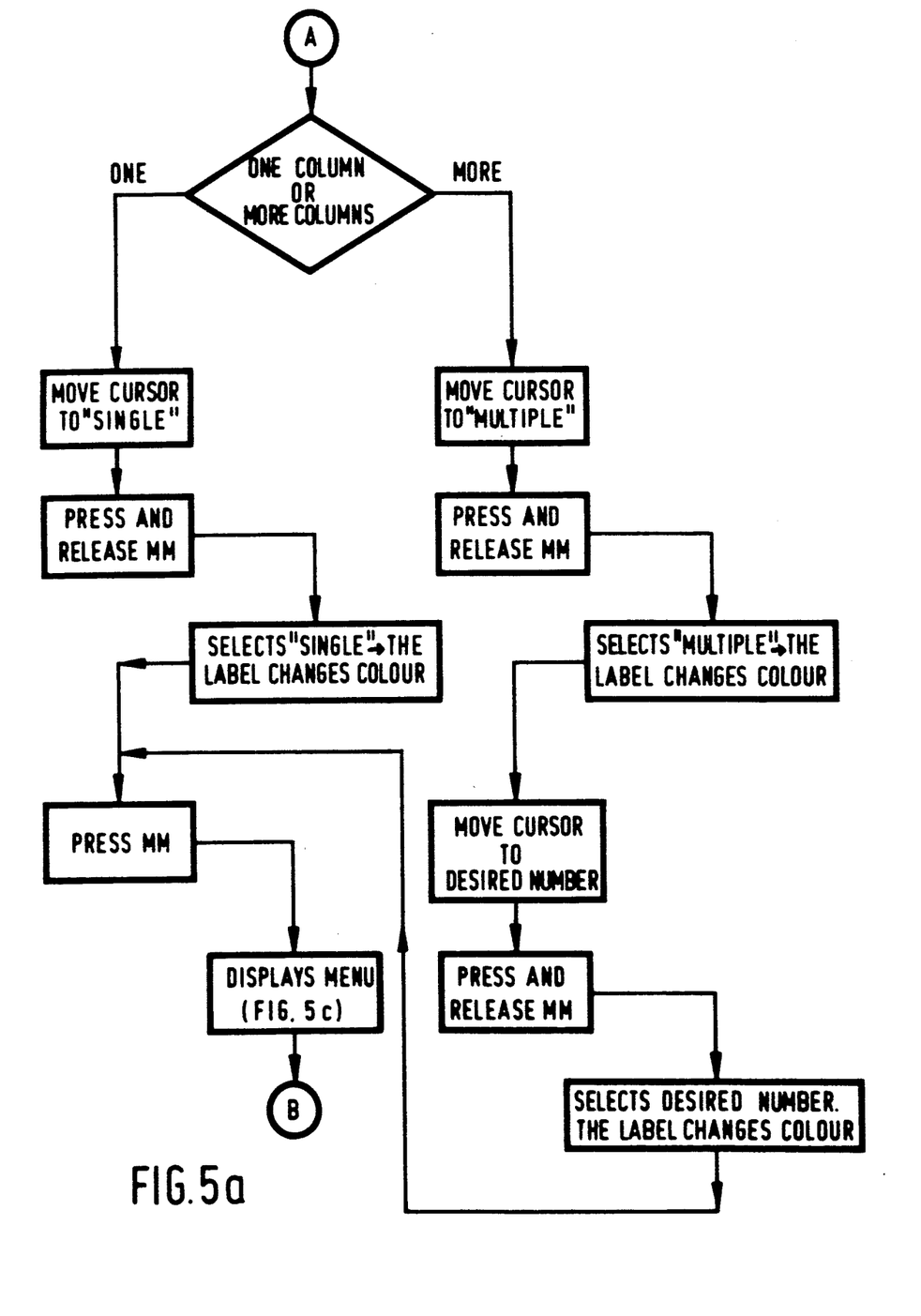
Figure 5B:
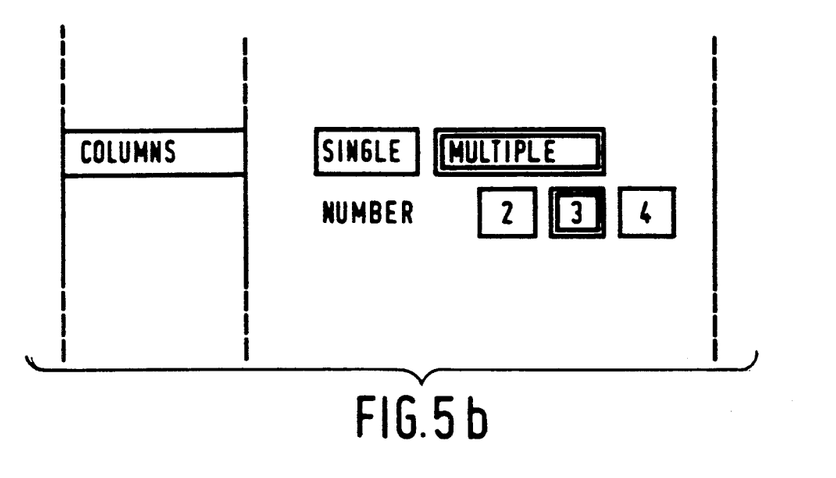

A properties window of this kind shows the various possible choices in respect of the properties and the values of the properties with respect to the "page" component kind. Inter alia it contains data relating to the margin lines, the line thickness, the boundaries within which the contents of the page should be displayed, and the page numbering, kind of paper, and the like. Important to the present system is that the properties window should contain the question whether one or more columns are required. This question starts the sequence of the operating procedure shown in FIG. 5a. If the cursor is moved to "single" in the properties window as partially shown in FIG. 5b, and if the mouse menu button MS in then pressed, the system reacts to this by changing the color of the "single" label as an indication that this option has been selected. If the mouse menu button MM is then pressed then the system reacts to this by showing the menu illustrated in FIG. 5c.

If, on the other hand, the cursor is moved to "multiple" to show that more than one column is required, and if the menu button MS is then pressed this will select "multiple", which in this case changes color. The system then offers the possibility of a selection between two, three of four columns, for example. After, for example, the selection of "three" by actuation of the menu button MS, there is then a change of color and after the mouse menu button MM has been actuated the menu shown in FIG. 5c is displayed on the screen 2.

Figure 5C:
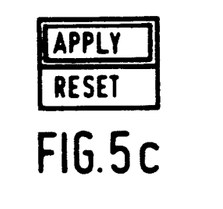
Figure 6A:
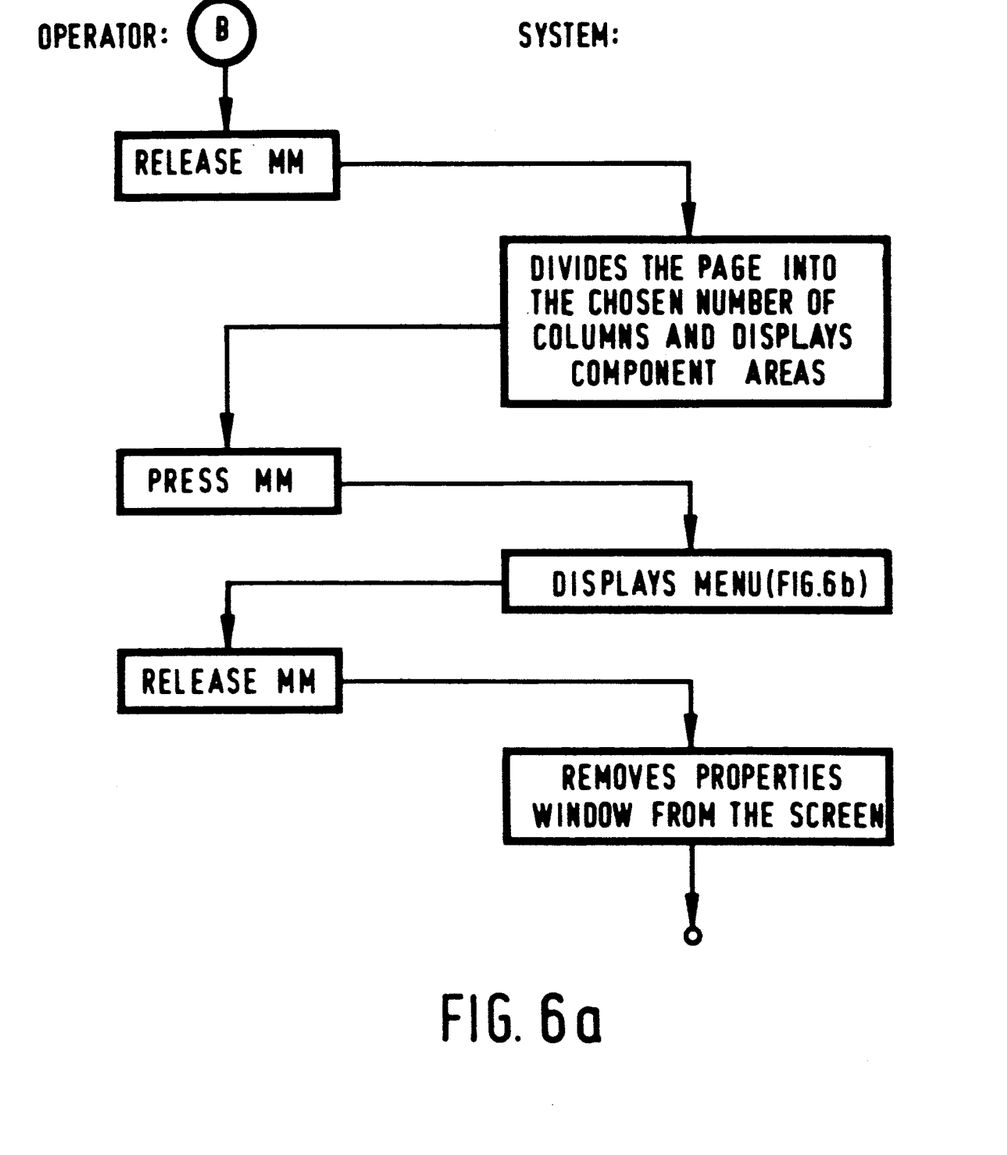
Figure 6B:
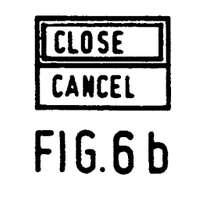

FIG. 6a shows the further sequence of the procedure if "apply" is selected in the menu shown in FIG. 5c. On release of the mouse menu button MM, the system divides the page into the chosen number of columns, i.e., three in this example. The component area in which the component columns are to be displayed shows one or more columns depending on the state of the component column area of "label area", which will be explained hereinafter. When the MM button is pressed again the system shows the menu illustrated in FIG. 6b. In both cases for selection the system continues by removing the properties window from the screen 2. If the option "close" is chosen the preceding procedure is regarded as closed and if the "cancel" option is chosen the commands are regarded as if they had not been given.

It will be obvious that component columns and areas are only reproduced on a screen, but not on paper during a printing procedure.

Change of State of Component Area

The procedure of changing the "label area" will be explained in detail hereinafter. This procedure starts with the operator placing the cursor in the "Commands" field of the top frame 31 of the text window 30 (see FIG. 3). The operator than actuates the menu button MM whereupon the system displays the continuation menu shown in FIG. 7b. The operator then moves the cursor, having the form of the frame 41, to the menu field "component names" and then moves the mouse in the direction of symbol 40 whereupon the system shows the menu illustrated in FIG. 7c.

Figure 8:
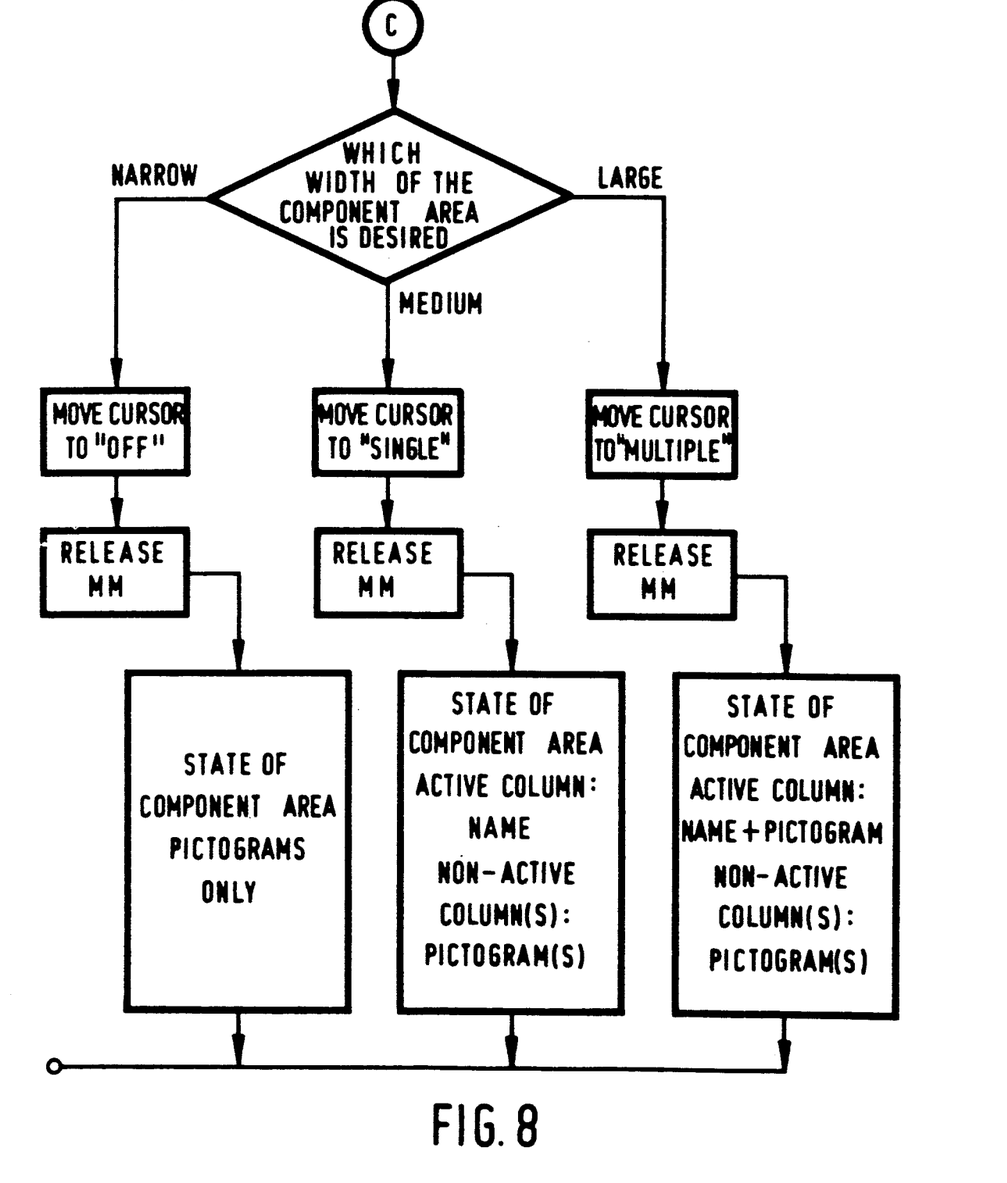

This situation and possible continuation of the procedure is shown in FIG. 8. The operator now has the choice of selecting "off", "single", or "multiple" by means of the cursor. The final choice is determined by reference to the fact whether the operator wants a narrow, medium or large width for the component area. On release of the menu button MM the state of the component area is changed in accordance with the commands input by the operator.

If the option "off" is selected, the screen shows all the component columns in which only pictograms are displayed. If the option "single" is selected, the screen displays pictograms in the component column (or columns) corresponding to the non-active text column (or columns) while in the component column corresponding to the active text column it displays only the name of the components contained therein. If, on the other hand, the option "multiple" is selected, the screen shows the document in the form as illustrated in FIG. 3. In both the non-active columns the components are displayed by pictograms while in the component column corresponding to the active text column both the pictogram and the name of the component are displayed in this case.

Although the invention has been explained in detail with reference to the preceding description of the associated drawings, it will be clear that it is not limited thereto. Given the contents of this document, the skilled addressee will find numerous alternative embodiments of both the system and the system procedure whereby a system operative in accordance with the idea of the invention is created.

System commands could, for example, also be input directly without the use of a mouse and menus. The commands in the menus in this description are given solely by way of example and the same applies to the component kinds, component types and component properties described and are simply a selection of a larger set. The way in which the invention is incorporated in the system software can also be embodied in all kinds of ways. Finally, the invention can also be applied in systems based on a hierarchical document model of components at different levels and each provided with properties with associated values.

Figure 7A:
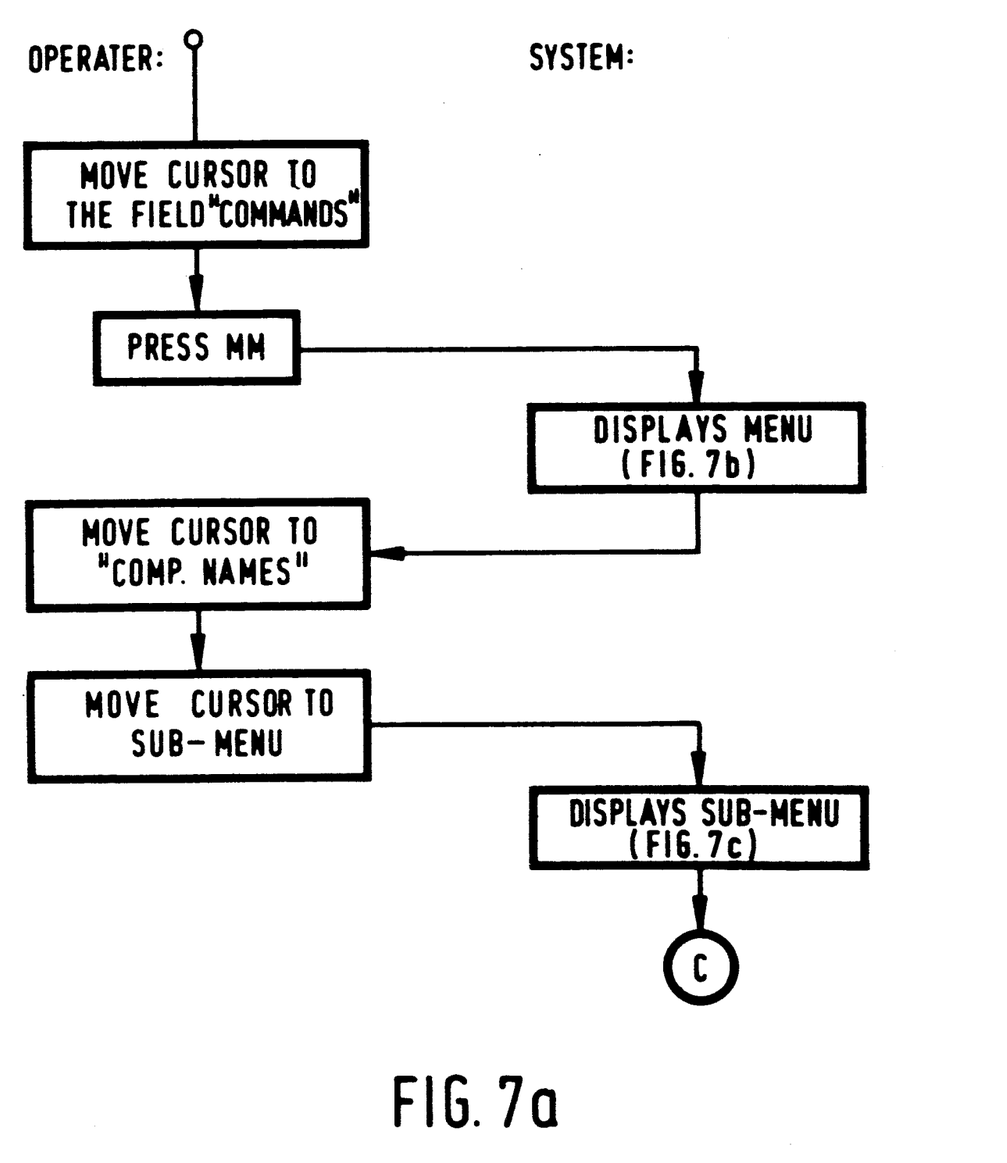
Figure 7B:
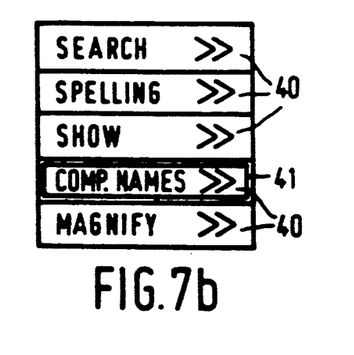
Figure 7C:
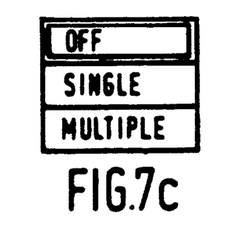

It should also be noted that by inputting the command "magnify" shown in FIG. 7b the text column in which the cursor is situated at that time is displayed in enlarged form. The possible disadvantage of too narrow and hence difficultly legible text columns is thus completely eliminated.

What is claimed is:

1. In a desktop publishing system comprising a display screen, inputting means for inputting document information and commands, and a processing unit coupled to the display screen and to said inputting means and programmed by reference to document information and commands, using the display screen, for the interactive makeup and management of documents according to a model of a document made up of one or more kinds of components each having a name and component-specific appearance properties, and which model represents a number of text columns for reproducing at least part of the contents of the document, the improvement in combination therewith comprising said processing unit being operable to set up a separate component column corresponding to each text column in order to identify, in case of presentation of a component column on the display screen, the start of the contents of the component in a text column by an indication in a corresponding component column at the level of the component contained in the text column, said processing unit causing said display screen to display for each text column to be displayed a corresponding component column which is at least partially reproduced on said display screen, said processing unit further causing an indication for each component of a text column to be displayed in a corresponding one of said at least partially reproduced component columns, said indication being in the form of an identification symbol of the component contained in the corresponding test column.

2. In a desktop publishing system according to claim 1, wherein said inputting means comprise a user-positionable display screen cursor and that text column in which said cursor is located is identified as an active text column, said indication being displayed on the display screen in said component column corresponding to said active text column, said indication being in the form of at least one of an identification symbol or a name of the component contained in the active text column.

3. In a desktop publishing system according to claim 1, wherein said component columns are displayed in a contiguous grouping on one side of said display screen, and wherein the corresponding text columns are displayed in a contiguous grouping on the other side of the display screen.

4. In a desktop publishing system according to claim 3, wherein said contiguous component columns are displayed on the left-hand side of said display screen and the contiguous text columns are displayed on the right-hand side thereof.

5. In a computerized method for making up documents, which method is controlled by a computer comprising a processing unit, inputting means coupled to said processing unit for inputting document information and commands, and a display screen coupled to the processing unit, wherein said documents are interactively made up and managed in accordance with a model of a document having one or more kinds of components each having a name and component-specific appearance properties, and which model represents a number of text columns for reproducing at least part of the contents of the document, the improvement therein comprising: operating said processing unit to set up a separate component column corresponding to each text column in order to identify, in case of presentation of a component column on the display screen, the start of the contents of the component in a text column by an indication in a corresponding component column at the level of the component contained in the text column, and causing said display screen to display an indication for each component of a text column in a corresponding one of said component columns, said indication being in the form of an identification symbol of the component contained in the corresponding text column.

6. A method according to claim 5, wherein said inputting means comprise a user-positionable display screen cursor and that text column in which said cursor is located is identified as an active text column, said indication being displayed on said display screen in the component column corresponding to said active text column, said indication being in the form of at least one of an identification symbol or a name of the component contained in the active text column.

7. A method according to claim 5 or 6, wherein said component columns are displayed in a contiguous grouping on one side of the display screen, and the corresponding text columns are displayed in a contiguous grouping on the other side of the display screen.

8. A method according to claim 7, wherein said contiguous component columns are displayed on the left-hand side of said display screen and the contiguous text columns are displayed on the right-hand side thereof.

* * * * *